United States Patent
Sonobe

(10) Patent No.: US 11,351,827 B2
(45) Date of Patent: Jun. 7, 2022

(54) AUTOMOBILE SUSPENSION PART

(71) Applicant: NIPPON STEEL CORPORATION, Tokyo (JP)

(72) Inventor: Soma Sonobe, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 17/417,147

(22) PCT Filed: Dec. 26, 2019

(86) PCT No.: PCT/JP2019/051172
§ 371 (c)(1),
(2) Date: Jun. 22, 2021

(87) PCT Pub. No.: WO2020/138311
PCT Pub. Date: Jul. 2, 2020

(65) Prior Publication Data
US 2022/0041026 A1 Feb. 10, 2022

(30) Foreign Application Priority Data
Dec. 26, 2018 (JP) .............................. JP2018-242323

(51) Int. Cl.
*B60G 7/00* (2006.01)
(52) U.S. Cl.
CPC ...................... *B60G 7/001* (2013.01)
(58) Field of Classification Search
CPC ...................................................... B60G 7/001
See application file for complete search history.

(56) References Cited

U.S. PATENT DOCUMENTS

| 7,387,307 B2 * | 6/2008 | Tanaka | B60G 3/202 280/124.135 |
| 9,895,947 B2 * | 2/2018 | Meyer | B60G 11/16 |
| 2006/0175788 A1 * | 8/2006 | Nuno | B60G 3/20 280/124.153 |

(Continued)

FOREIGN PATENT DOCUMENTS

| CN | 106163689 A | * 11/2016 | ............. B21D 22/26 |
| JP | 62-178408 A | 8/1987 | |

(Continued)

*Primary Examiner* — Darlene P Condra
(74) *Attorney, Agent, or Firm* — Birch, Stewart, Kolasch & Birch, LLP

(57) ABSTRACT

An automobile suspension part includes an arm member and a reinforcement, wherein: the arm member includes a top wall part, a first ridge line part, a second ridge line part, a first side wall part, and a second side wall part; the top wall part includes a first attachment part at a first end part; the top wall part includes a second attachment part at a second end part; the reinforcement includes a bottom wall part, a third ridge line part, and a flange part; the third ridge line part is sandwiched between the bottom wall part and the flange part; the bottom wall part is joined to the first side wall part and the second side wall part; the third ridge line part is connected to the first side wall part and the second side wall part; the flange part is joined to the top wall part between the first attachment part and the second attachment part; and the flange part is connected to the first side wall part and the second side wall part.

7 Claims, 15 Drawing Sheets

(56) References Cited

U.S. PATENT DOCUMENTS

| | | | | |
|---|---|---|---|---|
| 2012/0299263 A1* | 11/2012 | Mielke | ............. | B60G 7/001 |
| | | | | 280/124.134 |
| 2015/0115561 A1* | 4/2015 | Nakasato | ............. | B60G 15/067 |
| | | | | 280/124.151 |
| 2017/0203624 A1* | 7/2017 | Mielke | ............. | B60G 7/02 |
| 2020/0317013 A1* | 10/2020 | Friesen | ............. | B60G 7/001 |

FOREIGN PATENT DOCUMENTS

| | | | | |
|---|---|---|---|---|
| JP | 2-38117 A | 2/1990 | | |
| JP | 8-197922 A | 8/1996 | | |
| JP | 8-197923 A | 8/1996 | | |
| JP | 8-332820 A | 12/1996 | | |
| WO | WO-2007020938 A1 * | 2/2007 | ............. | B60G 7/001 |

* cited by examiner

AUTOMOBILE SUSPENSION PART

TECHNICAL FIELD

This disclosure relates to an automobile suspension part.

BACKGROUND ART

Due to tightened fuel consumption restriction in recent years, weight reduction of a body is required, and automobile suspension parts constituting the body are also required to be similarly reduced in weight. However, merely replacing materials of the parts with the ones having a smaller thickness with higher strength may cause a decrease in rigidity, and therefore the requirement for reduction in weight is desirably coped with by improvement of part structures.

As a structure of the automobile suspension part, a rear wheel suspension arm of an automobile is disclosed in Patent Document 1. Patent Document 1 discloses a structure in which an upper arm in an open cross-section shape is covered with a plate member, a structure in which partition wall members are provided at an interval along a curve direction of the upper arm, and a structure in which an intermediate vertical wall is provided between a pair of vertical flanges of the upper arm. Patent Document 2 discloses a suspension arm in which recessed portions are formed at a predetermined interval in an arm main body portion along a curve direction.

PRIOR ART DOCUMENT

Patent Document

Patent Document 1: Japanese Laid-open Patent Publication No. H8-197923

Patent Document 2: Japanese Laid-open Patent Publication No. H8-332820

SUMMARY OF THE INVENTION

Problems to be Solved by the Invention

For example, in the front lower arm as illustrated in FIG. 1, when a load in a direction (a direction D in FIG. 1) from a body front portion to a body rear portion is input into an end part 10a on a wheel attachment side, a torsional deformation of the whole arm is likely to occur with an end part 10b on a body attachment side as the starting point.

This disclosure has been made in consideration of the above circumstances, and its object is to suppress the torsional deformation of an automobile suspension part.

Means for Solving the Problems

An aspect of this disclosure solving the above problem is an automobile suspension part including an arm member in a groove shape and a reinforcement in a plate shape, wherein: the arm member includes a top wall part, a first ridge line part, a second ridge line part, a first side wall part, and a second side wall part; the top wall part includes a first attachment part at a first end part; the top wall part includes a second attachment part at a second end part; the first ridge line part is sandwiched between the top wall part and the first side wall part; the second ridge line part is sandwiched between the top wall part and the second side wall part; the first ridge line part and the second ridge line part extend along an extending direction of the top wall part; the reinforcement includes a bottom wall part, a third ridge line part, and a flange part; the third ridge line part is sandwiched between the bottom wall part and the flange part; the bottom wall part is joined to the first side wall part and the second side wall part; a transverse cross-section of the automobile suspension part including the arm member and the reinforcement is a closed cross-section; the third ridge line part is connected to the first side wall part and the second side wall part; the flange part is joined to the top wall part between the first attachment part and the second attachment part; and the flange part is connected to the first side wall part and the second side wall part.

Effect of the Invention

It is possible to suppress the torsional deformation of an automobile suspension part.

EMBODIMENTS FOR CARRYING OUT INVENTION

Figure 1:
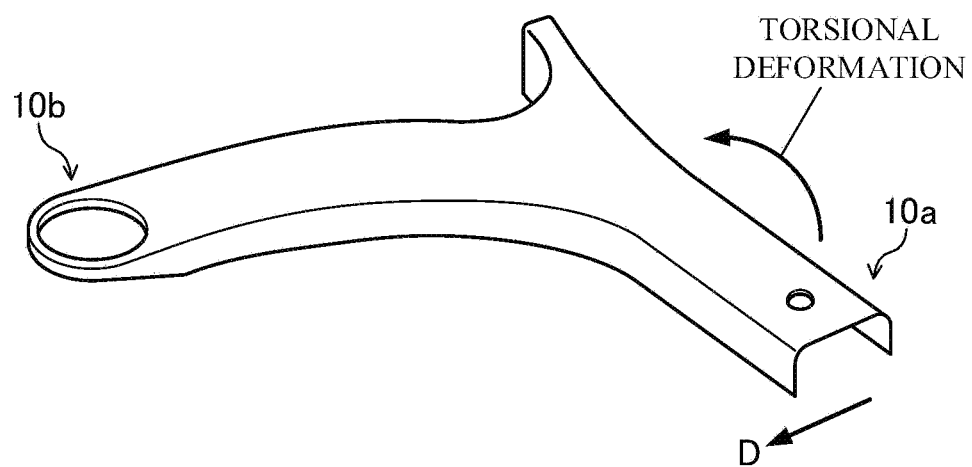
FIG. 1 is a view illustrating a shape example of an automobile suspension part.
Figure 2:
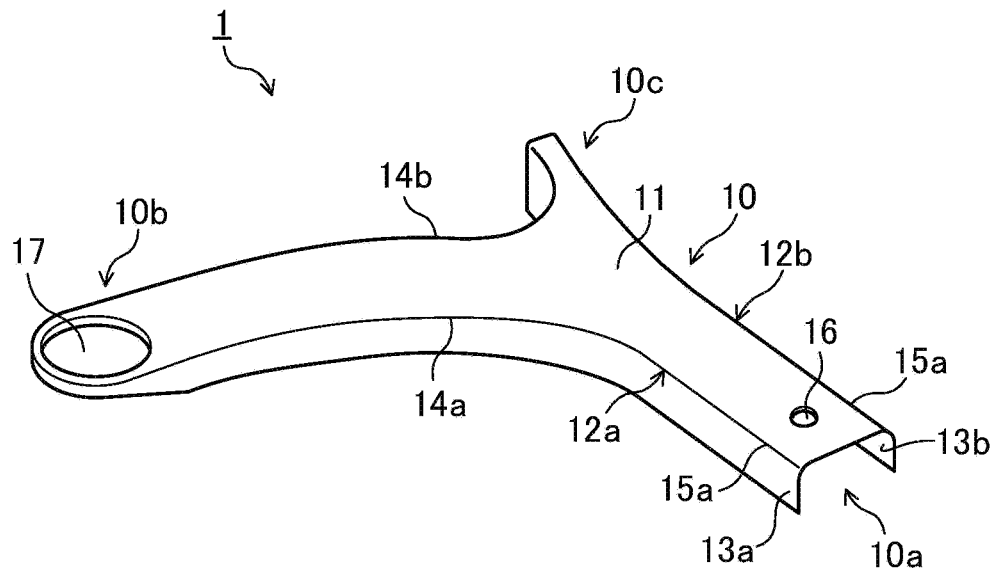
FIG. 2 is a perspective view illustrating a schematic configuration of the automobile suspension part.

Hereinafter, an embodiment of this disclosure will be explained referring to the drawings. Note that in this description and the drawings, the same codes are given to components having substantially the same functional configurations to omit duplicated explanation.

An "automobile suspension part" in this description is, for example, a lower arm, an upper arm or the like. In this embodiment, a front lower arm is exemplified as an automobile suspension part 1. As illustrated in FIG. 2 to FIG. 5, the automobile suspension part 1 in this embodiment is a part extending in three directions, and includes an arm member 10 in a groove shape and a reinforcement 20 in a plate shape.

The arm member 10 in this embodiment includes a top wall part 11, a first ridge line part 12a, a second ridge line part 12b, a first side wall part 13a, and a second side wall part 13b. The arm member 10 in this embodiment is a member in which a center line of the member linking a first end part 10a and a second end part 10b is curved with the first ridge line part 12a side as an inner side in a plan view viewed from a direction perpendicular to the top wall part 11. The top wall part 11 has a first end part 10a and a second end part 10b. In the case of this embodiment, the first end part 10a is an end part on a wheel attachment side, and the second end part 10b is an end part on a body attachment side.

The first end part 10a of the arm member 10 includes a first attachment part $P_1$. The first attachment part $P_1$ is a portion to which another part is attached, and the first attachment part $P_1$ in this embodiment has a hole 16 to which a part (for example, a knuckle) on the wheel side is attached. The first attachment part $P_1$ in this description is the center of the hole 16. The second end part 10b of the arm member 10 includes a second attachment part $P_2$. The second attachment part $P_2$ is a portion to which another part is attached, and the second attachment part $P_2$ in this embodiment has a hole 17 to which a part (for example, a front sub-frame) on the body side is attached. The second attachment part $P_2$ in this description is the center of the hole 17.

The first ridge line part 12a of the arm member 10 is sandwiched between the top wall part 11 and the first side wall part 13a. The second ridge line part 12b of the arm member 10 is sandwiched between the top wall part 11 and the second side wall part 13b. The first ridge line part 12a and the second ridge line part 12b extend along an extending direction of the top wall part 11.

The first ridge line part 12a in this embodiment includes a first curved part 14a curved to the inner side of the top wall part 11, and a first straight part 15a. In other words, the center of curvature of the first curved part 14a is located on the outside of the top wall part 11, and the top wall part 11 does not exist between the center of curvature and the first curved part 14a. The first straight part 15a is located on the side closer to the first end part 10a than is the first curved part 14a. The second ridge line part 12b in this embodiment includes a second curved part 14b curved to the outer side of the top wall part 11, and a second straight part 15b. In other words, the center of curvature of the second curved part 14b is located on the outside of the top wall part 11, and the top wall part 11 exists between the center of curvature and the second curved part 14b. The second straight part 15b is located on the side closer to the first end part 10a than is the second curved part 14b. The arm member 10 in this embodiment includes a third end part 10c which is branched from the second curved part 14b and extends toward the outside of the top wall part 11. The third end part 10c in this embodiment is an end part on the body attachment side. Note that the arm member 10 does not have to include the first curved part 14a and the second curved part 14b, and the arm member 10 may have a linear shape as a whole. Further, the arm member 10 does not have to include the third end part 10c.

Figure 6:
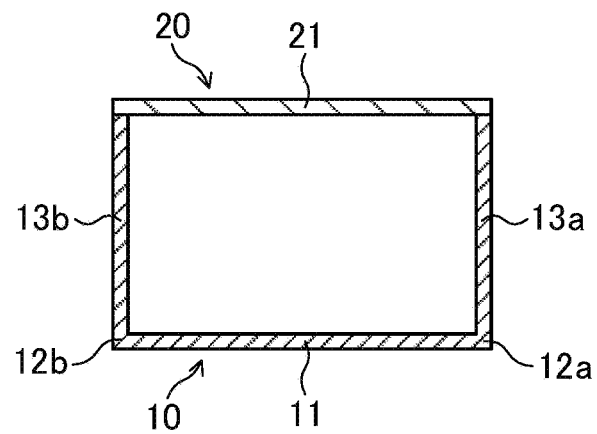
FIG. 6 is a view illustrating an A-A cross-section in FIG. 4. The A-A cross-section is a transverse cross-section of the automobile suspension part including an arm member and a reinforcement.

The reinforcement 20 has a bottom wall part 21, a third ridge line part 22, and a flange part 23. The bottom wall part 21 of the reinforcement 20 is joined to each of the first side wall part 13a of the arm member 10 and the second side wall part 13b of the arm member 10. Thus, an opening portion of the arm member 10 in the groove shape is partially covered with the bottom wall part 21 of the reinforcement 20. In other words, the automobile suspension part 1 has a portion having, as a transverse cross-section perpendicular to a part longitudinal direction, a closed cross-section as illustrated in FIG. 6 formed by the arm member 10 and the bottom wall part 21 of the reinforcement 20.

Figure 3:
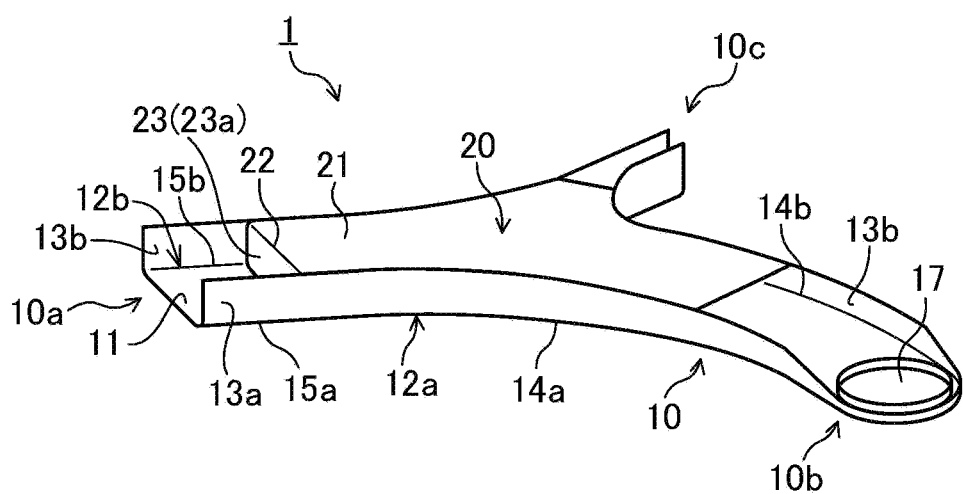
FIG. 3 is a perspective view of the automobile suspension part in FIG. 2 as viewed from the back.
Figure 5:
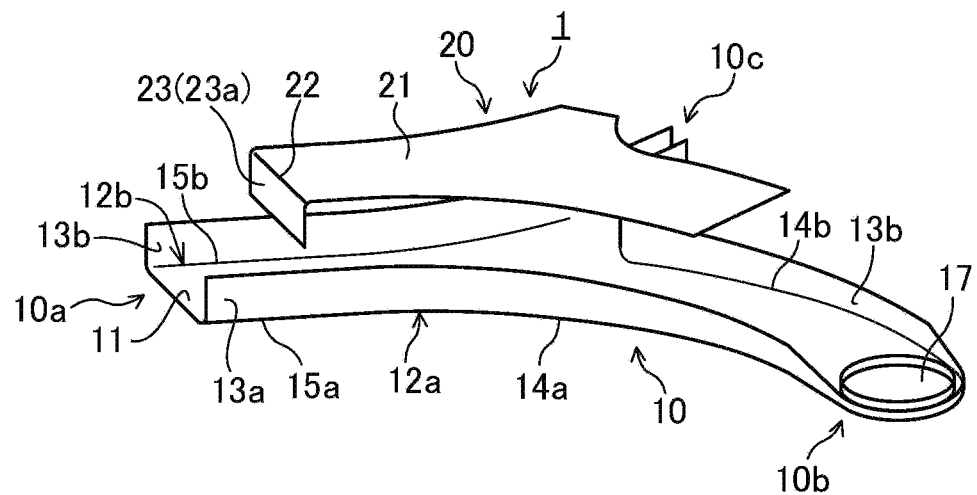
FIG. 5 is an exploded view of the automobile suspension part in FIG. 3.

The third ridge line part 22 of the reinforcement 20 is sandwiched between the bottom wall part 21 and the flange part 23 as illustrated in FIG. 3 and FIG. 5. The third ridge line part 22 is located between the first side wall part 13a and the second side wall part 13b, and is connected to the first side wall part 13a and the second side wall part 13b. Note that "connection" between parts in this description includes a form in which parts are simply in contact with each other, and a form in which parts are joined to each other, for example, by welding. In the case where the bottom wall part 21 is joined to the side wall parts 13a, 13b, the joining method is not particularly limited, and an arc welding may be employed for instance. In the case where the bottom wall part 21 is arc-welded to the side wall parts 13a, 13b, the welding does not have to be full-circled welding.

Figure 7:
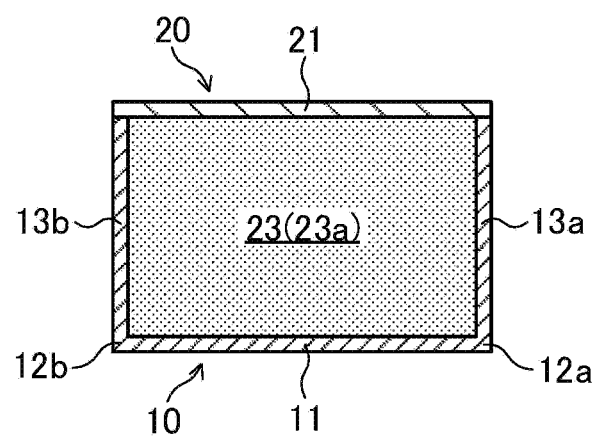
FIG. 7 is a view illustrating a B-B cross-section in FIG. 4. The B-B cross-section is a transverse cross-section of the automobile suspension part including a flange part of the reinforcement.

The flange part 23 continues to the bottom wall part 21 via the third ridge line part 22. The flange part 23 extends toward the top wall part 11 of the arm member 10, and is joined to the top wall part 11 located between the first attachment part $P_1$ of the arm member 10 and the second attachment part $P_2$ of the arm member 10. Therefore, at the position where the flange part 23 of the reinforcement 20 is provided, an inner space in the closed cross-section formed by the arm member 10 and the reinforcement 20 is covered with the flange part 23 as illustrated in FIG. 7. The joining method of the flange part 23 of the reinforcement 20 and the top wall part 11 of the arm member 10 is not particularly limited, and the arc welding may be employed for instance. In the case where the flange part 23 of the reinforcement 20 and the top wall part 11 of the arm member 10 are arc-welded, the welding does not have to be full-circled welding.

The flange part 23 is connected to the first side wall part 13a of the arm member 10 and the second side wall part 13b of the arm member 10. Note that from the viewpoint of further improving the effect of suppressing the torsional deformation of the automobile suspension part 1, the flange part 23 is preferably joined to the first side wall part 13a and the second side wall part 13b.

The automobile suspension part 1 in this embodiment is configured as above. The automobile suspension part 1 in this embodiment is configured such that a load in a direction (a direction D in FIG. 4 in this embodiment) from a body front part toward a body rear part is inputted into the first end part 10a that is the end part on the wheel attachment side during body traveling. In this event, the second end part 10b and the third end part 10c which are end parts on the body attachment side are in a restrained state, so that a moment inducing torsional deformation occurs at the first attachment part $P_1$ of the arm member 10. On the other hand, in the automobile suspension part 1 in this embodiment, the reinforcement 20 including the flange part 23 is provided, so that the length of the arm member 10 is short in appearance. This length corresponds to $L-L_1$ (a difference between a length L and a length $L_1$) in FIG. 11 explained below. This can suppress the torsional deformation.

The above suppression of the torsional deformation enables improvement of the deformation strength of the part. Further, the part structure is not a complicated structure, and therefore can contribute to reduction in weight. Accordingly, in the automobile suspension part 1 in this embodiment, both the securement of the deformation strength and the reduction in weight can be achieved by the synergistic effect of the formation of the partially closed cross-section by the bottom wall part 21 of the reinforcement 20 and the arm member 10 and the reduction in length of the arm member 10 in appearance by the flange part 23 of the reinforcement 20.

In the case where the arm member 10 has the first curved part 14a, when a load in the direction (the direction D in FIG. 4 in this embodiment) from the body front part toward the body rear part is input into the first end part 10a, the stress is concentrated on the top wall part 11 and the first side wall part 13a at the first curved part 14a. Therefore, the out-of-plane deformation of folding in a direction (automobile height direction) perpendicular to the top wall part 11 is likely to occur at the top wall part 11 passing through the first curved part 14a. However, in the automobile suspension part 1 including the reinforcement 20, the arm member 10 and the reinforcement 20 form the closed cross-section at the first curved part 14a. This improves the flexural rigidity of the top wall part 11 and the first side wall part 13a at the first curved part 14a, hardly causing the out-of-plane deformation. In other words, the reinforcement 20 as in this embodiment, when provided at the arm member 10 having the first curved part 14a, can provide the effect of suppressing the out-of-plane deformation in addition to the effect of suppressing the torsional deformation.

Figure 8:
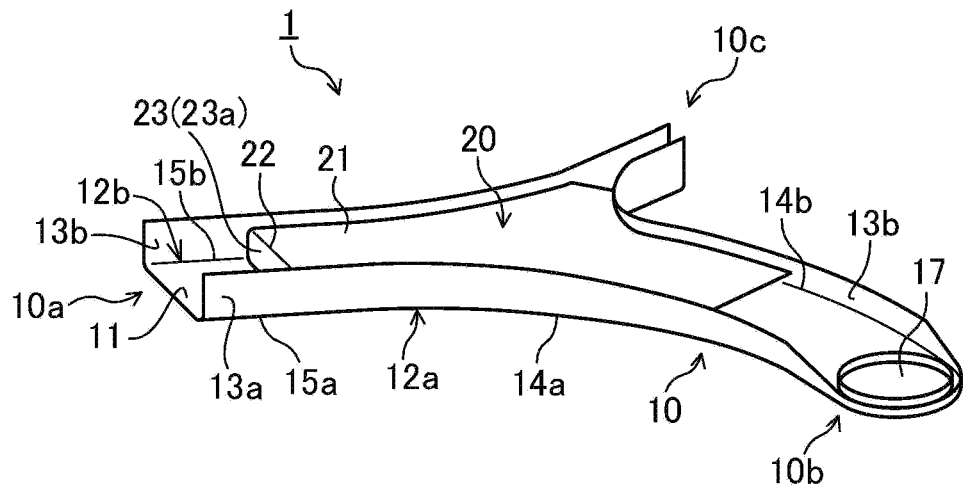
FIG. 8 is a perspective view illustrating a shape example of the reinforcement.
Figure 9:
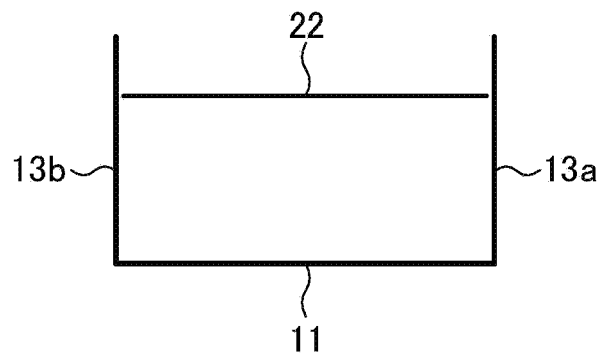
FIG. 9 is a schematic view illustrating a connection position of a third ridge line part with respect to a first side wall part and a second side wall part.
Figure 10:
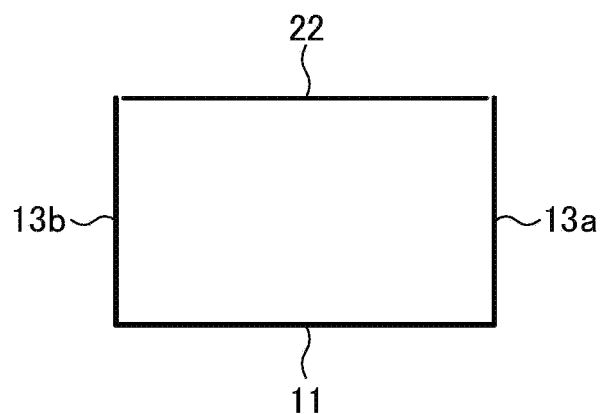
FIG. 10 is a schematic view illustrating a connection position of the third ridge line part with respect to the first side wall part and the second side wall part.

Note that in the example in FIG. 6, the bottom wall part 21 is connected to tips of the first side wall part 13a and the second side wall part 13b. On the other hand, in order to easily join the bottom wall part 21 to the first side wall part 13a and the second side wall part 13b, the third ridge line part 22 preferably stands with respect to the first side wall part 13a and the second side wall part 13b of the arm member 10 as illustrated in FIG. 8 to FIG. 9. FIG. 9 is a schematic view illustrating a connection position of the third ridge line part 22 with respect to the first side wall part 13a and the second side wall part 13b. That the third ridge line part 22 "stands" with respect to the first side wall part 13a and the second side wall part 13b in this description means a state where the third ridge line part 22 is not located at the tip portions of the first side wall part 13a and the second side wall part 13b in the transverse cross-section of the automobile suspension part 1, for example, as in FIG. 9. For example, in the case of the connection position in FIG. 10, the third ridge line part 22 is located at the tip portions of the first side wall part 13a and the second side wall part 13b, so that it cannot be said that the third ridge line part 22 stands with respect to the first side wall part 13a and the second side wall part 13b.

In the case where the third ridge line part 22 stands with respect to the first side wall part 13a and the second side wall part 13b as in FIG. 9, the bottom wall part 21 can be fillet-welded to the first side wall part 13a and the second side wall part 13b. This facilitates manufacture of the automobile suspension part 1 and improves the productivity.

The flange part 23 is preferably located between the first straight part 15a and the second straight part 15b of the arm member 10. The flange part 23 is desirably in contact with the first side wall part 13a, the second side wall part 13b, and the top wall part 11 in a transverse cross-section of the part 1 passing through the flange part 23. Then, the flange part 23 can resist the cross-sectional distortion due to the torsional deformation of the part 1. More desirably, the flange part 23 is joined to the first side wall part 13a, the second side wall part 13b, and the top wall part 11. Further, the longer the side of the flange part 23 in contact with the first side wall part 13a, the second side wall part 13b, and the top wall part 11 is, the more desirable. In other words, to resist the torsional deformation of the part 1, it is most desirable that the flange part 23 closes the whole transverse cross-section of the part 1 and the entire length of the side of the flange part 23 in contact with the arm member 10 is joined to the arm member 10.

Figure 11:
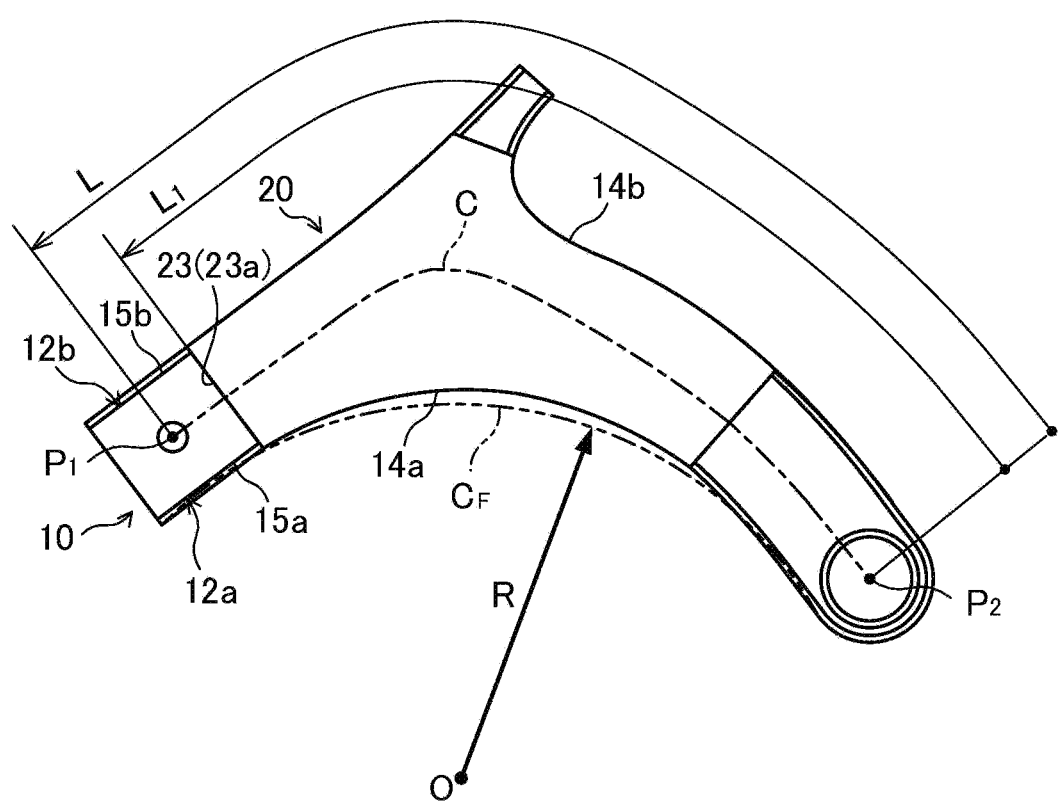
FIG. 11 is a view for explaining a preferable position of a first flange part.

In the case where the arm member 10 has the first curved part 14a, the position of the flange part 23 of the reinforcement 20 is preferably close to a load input point. More specifically, the position of the flange part 23 is preferably located in the following range. As illustrated in FIG. 11, first of all, a curved line made by fitting the visible outline of the first ridge line part 12a with a curvature in a plan view viewed from a direction perpendicular to the top wall part 11 is defined. This curved line is called a first curved line $C_F$. Next, a centroid of the cross-section of the part (the front lower arm in this embodiment) cut along the normal line extending in a radial direction R from a curvature center O of the first curved line $C_F$ is calculated. Then, a curved line passing through the centroid of each cross-section is defined. This curved line is called a second curved line C. Next, the length from the second attachment part $P_2$ of the second end part 10b to the first attachment part $P_1$ of the first end part 10a on the second curved line C (hereinafter, an "inter-attachment part length") is defined as L. Besides, the length from the second attachment part $P_2$ of the second end part 10b to the flange part 23 of the reinforcement 20 on the second curved line C (hereinafter, a "first length") is defined as $L_1$. In the case where the inter-attachment part length L and the first length $L_1$ are defined as above, the first length $L_1$ is preferably 83% or more of the inter-attachment part length L. This can effectively suppress the torsional deformation and further improve the mass efficiency of the deformation strength. Note that the upper limit of the first length $L_1$ is appropriately changed according to the shape of the arm member 10 and the shape of the mating part in consideration of the attachment space for the part, and the first length $L_1$ is, for example, 95% or less of the inter-attachment part length L.

Figure 12:
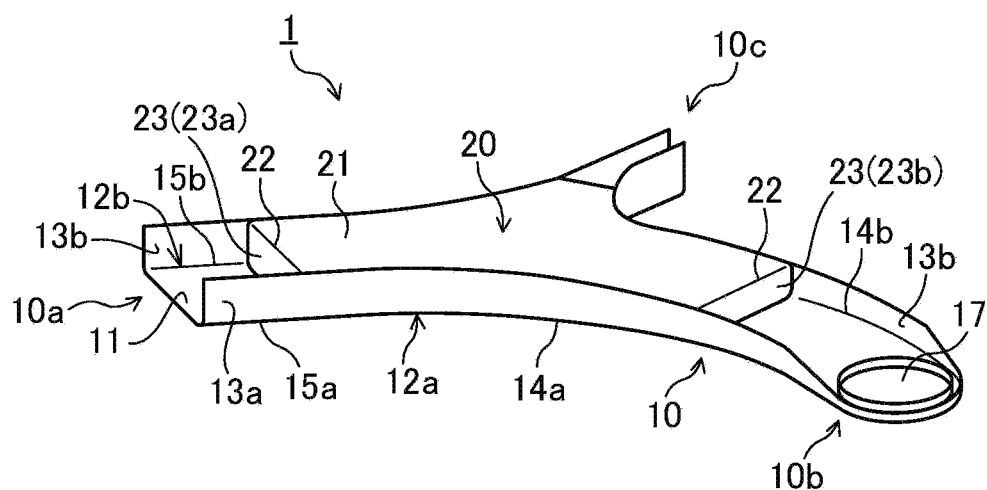
FIG. 12 is a view illustrating a shape example of the reinforcement.
Figure 13:
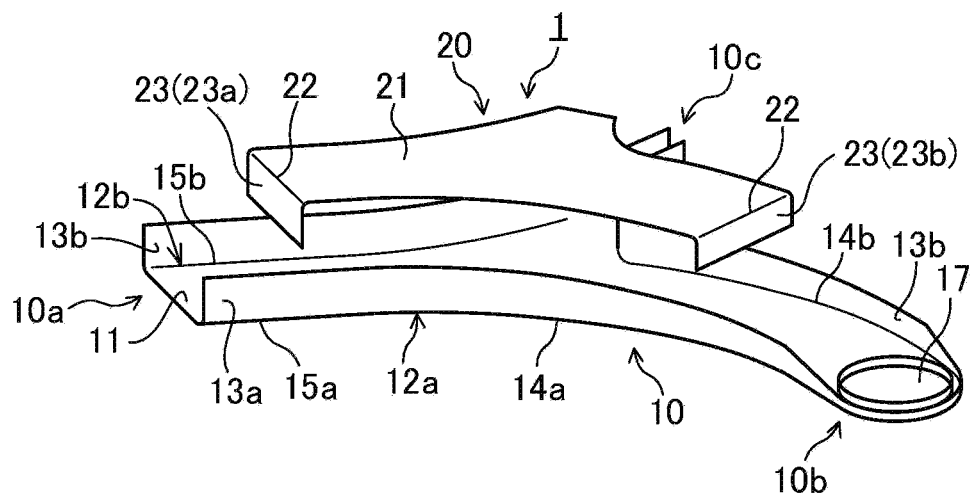
FIG. 13 is an exploded view of an automobile suspension part in FIG. 12.

If the above flange part 23 is called a first flange part 23a, the reinforcement 20 may have a second flange part 23b as in FIG. 12 and FIG. 13 as another flange part 23. The second flange part 23b is provided between the first flange part 23a and the second attachment part $P_2$ of the arm member 10. The second flange part 23b extends toward the top wall part 11 of the arm member 10 and is joined to the top wall part 11. Further, the second flange part 23b is connected to the first side wall part 13a and the second side wall part 13b of the arm member 10. In the case where the second flange part 23b is provided in addition to the first flange part 23a, it is possible to further enhance the flexural rigidity of the arm member 10 to improve the deformation strength.

Figure 14:
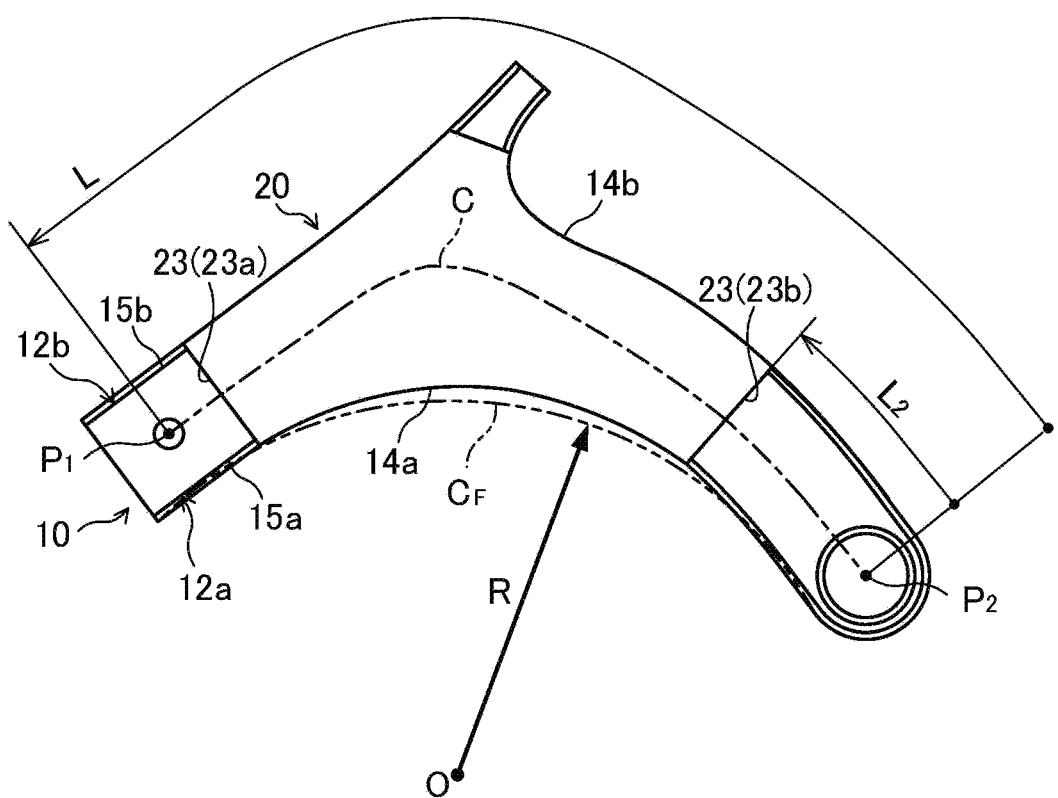
FIG. 14 is a view for explaining a preferable position of a second flange part.

Here, as illustrated in FIG. 14, the length from the second attachment part $P_2$ of the second end part 10b to the second flange part 23b on the second curved line C (hereinafter, a "second length") is defined as $L_2$. In this case, the second length $L_2$ is preferably 36% or less of the inter-attachment part length L. This can effectively improve the mass efficiency of the deformation strength. From the viewpoint of improving the mass efficiency of the deformation strength, the second length $L_2$ is preferably 30% or less of the inter-attachment part length L. Note that the lower limit of the second length $L_2$ is appropriately changed according to the shape of the arm member 10 and the shape of the mating part in consideration of the attachment space for the part, and the second length $L_2$ is, for example, 10% or more of the inter-attachment part length L.

Figure 15:
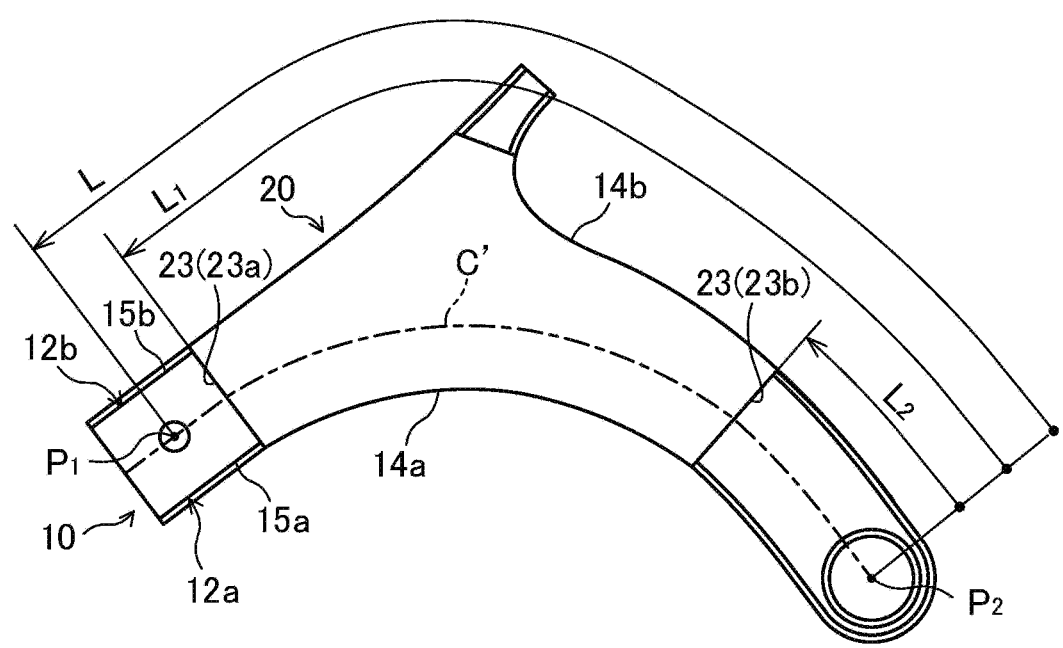
FIG. 15 is a view for explaining preferable positions of the first flange part and the second flange part.

In the above explanation, the inter-attachment part length L, the first length $L_1$, and the second length $L_2$ are defined based on the first curved line $C_F$ and the second curved line C, and these lengths may be defined based on a line C' illustrated in FIG. 15. The line C' is a line made by offsetting the visible outline of the first ridge line part 12a so as to pass through the first attachment part $P_1$ and the second attachment part $P_2$ in a plan view viewed from the direction perpendicular to the top wall part 11. Under this definition, the inter-attachment part length L is a length from the second attachment part $P_2$ to the first attachment part $P_1$ on the line C'. Besides, the first length $L_1$ is a length from the second attachment part $P_2$ to the first flange part 23a on the line C'. Besides, the second length $L_2$ is a length from the second attachment part $P_2$ to the second flange part 23b on the line C'.

Strictly, the inter-attachment part length L, the first length $L_1$, and the second length $L_2$ based on the second curved line C in FIG. 11 and FIG. 14 are different from the inter-attachment part length L, the first length $L_1$, and the second length $L_2$ based on the line C' in FIG. 15, respectively. However, when considering them in terms of $L_1/L$ and $L_2/L$, the preferable numerical value ranges of $L_1/L$ and $L_2/L$ are substantially not different even if the inter-attachment part length L, the first length $L_1$, and the second length $L_2$ are defined based on any of the second curved line C and the line C'. More specifically, even when the inter-attachment part length L, the first length $L_1$, and the second length $L_2$ are defined based on the line C', the first length $L_1$ is preferably 83% or more of the inter-attachment part length L. Besides, the second length $L_2$ is preferably 36% or less of the inter-attachment part length L.

An embodiment of this disclosure has been explained above, but this disclosure is not limited to the embodiment. It should be understood that various changes and modifications are readily apparent to those skilled in the art within the scope of the technical spirit as set forth in claims, and those should also be covered by the technical scope of this disclosure.

EXAMPLES

<Simulation (1)>

Figure 16:
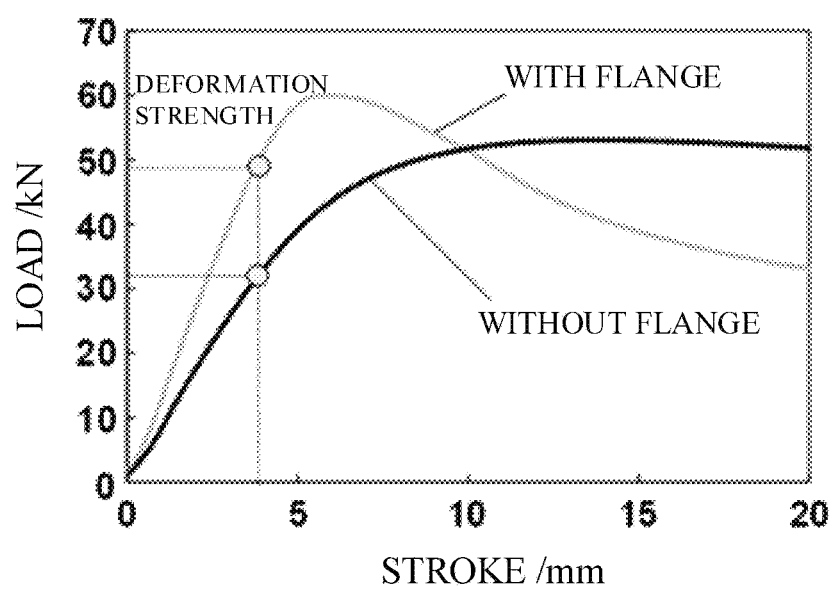
FIG. 16 is a chart illustrating a result of Simulation (1).

A deformation simulation was carried out on an analysis model of the front lower arm. The analysis model is a model that is in the same structure as that in FIG. 3 and FIG. 4 and has the first flange part 23a. The simulation is carried out under a condition that the first end part 10a is stroked along the direction (the direction D in FIG. 4) from the body front portion to the body rear portion in a state where the second end part 10b and the third end part 10c are restrained. Besides, an analysis model having no flange part was created and subjected to the simulation under the same condition as a comparative example. The result of Simulation (1) is illustrated in FIG. 16. The model "with a flange part" in FIG. 16 is the same as Model 1 in later-explained Simulation (4).

As illustrated in FIG. 16, in the analysis model having the first flange part, the load can be increased with respect to the stroke amount at the first end part and the deformation strength can be enhanced as compared with the comparative example.

<Simulation (2)>

Figure 17:
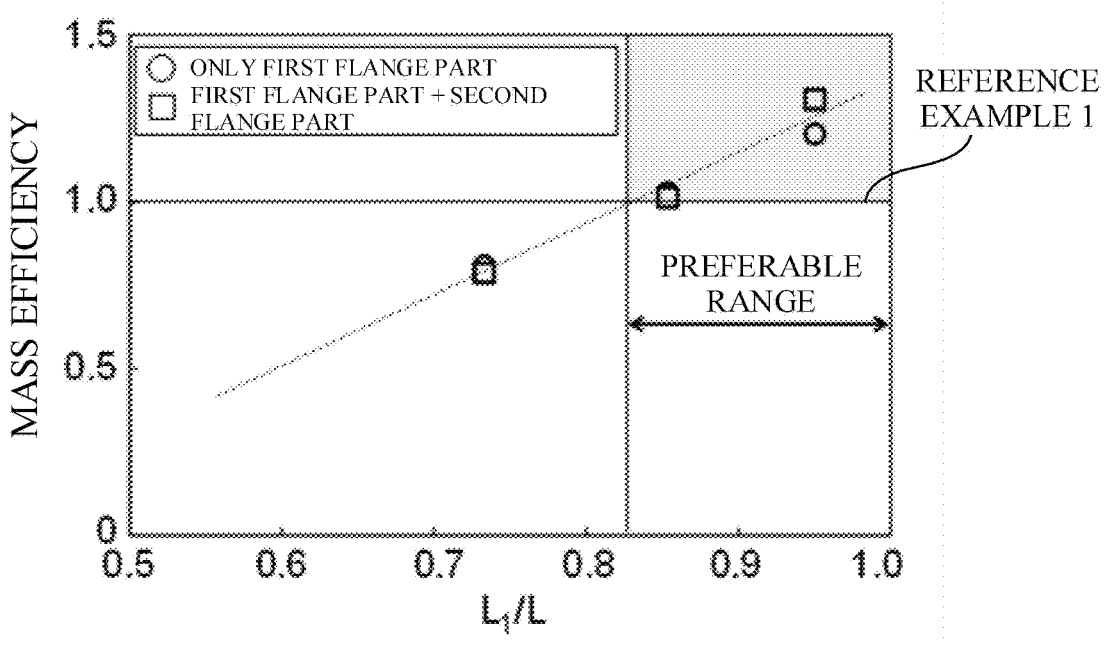
FIG. 17 is a chart illustrating a result of Simulation (2).

A similar simulation was carried out on an analysis model different in position of the first flange part. Further, a similar simulation was carried out on an analysis model different in position of the first flange part when the first flange part and the second flange part were provided. The (second length $L_2$/inter-attachment part length L) in the case where the second flange part is provided is 0.29. Note that as Reference Example 1, a similar simulation was carried out on an analysis model having a closed cross-section structure made by covering the whole arm member in a groove shape with a plate. In the analysis model in Reference Example 1, none of the first flange part or the second flange part is provided. The result of Simulation (2) is illustrated in FIG. 17. Note that the vertical axis in FIG. 17 is standardized by the simulation result in Reference Example 1, and the value indicated on the vertical axis is a dimensionless value made by dividing the mass efficiency of the deformation strength of each analysis model by the mass efficiency of the deformation strength in Reference Example 1 obtained by the simulation.

As illustrated in FIG. 17, a larger (first length $L_1$/inter-attachment part length L) can further enhance the mass efficiency of the deformation strength. In particular, in this simulation result, the mass efficiency of the deformation strength when $L_1/L$ is 0.83 or more is improved more than that in Reference Example 1. Therefore, in the viewpoint of effectively improving the mass efficiency of the deformation strength, the first length $L_1$ is more preferably 83% or more of the inter-attachment part length L.

<Simulation (3)>

Figure 18:
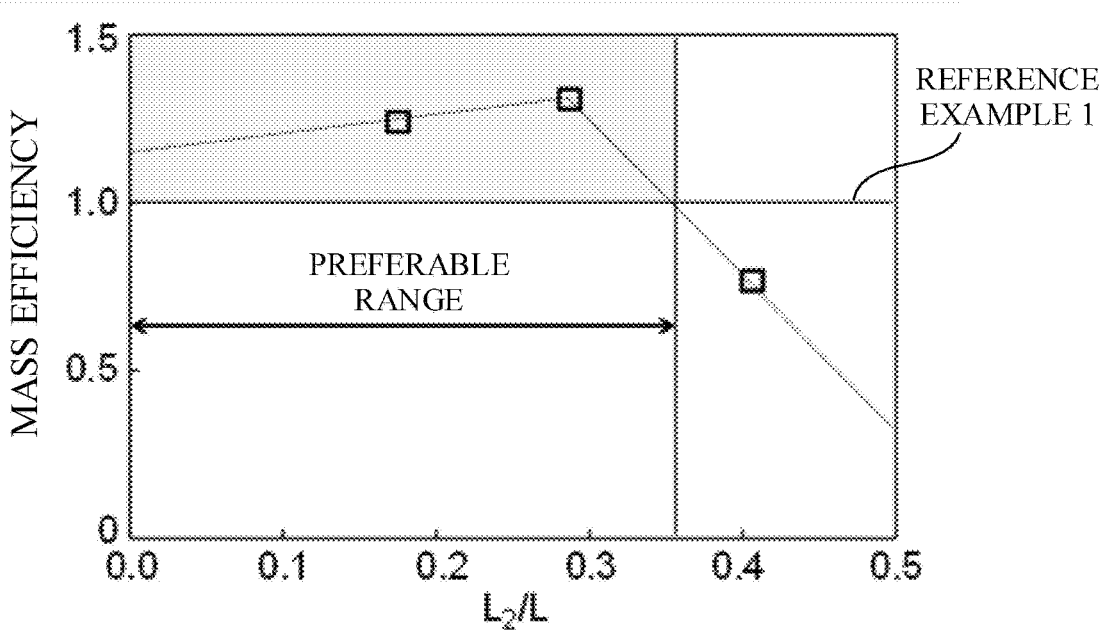
FIG. 18 is a chart illustrating a result of Simulation (3).

A similar simulation was carried out on an analysis model different in position of the second flange part in the structure provided with the first flange part the second flange part. The (first length $L_1$/inter-attachment part length L) is 0.95. The result of Simulation (3) is illustrated in FIG. 18. Note that the vertical axis in FIG. 18 is standardized by the simulation result in Reference Example 1, and the value indicated on the vertical axis is a dimensionless value made by dividing the mass efficiency of the deformation strength of each analysis model by the mass efficiency of the deformation strength in Reference Example 1 obtained by the simulation.

As illustrated in FIG. 18, in the result of this simulation, the mass efficiency became highest when the (second length $L_2$/inter-attachment part length L) was 0.29. In particular, in this simulation result, the mass efficiency of the deformation strength when $L_2/L$ is 0.36 or less is increased more than that in Reference Example 1. Therefore, in the viewpoint of effectively improving the mass efficiency of the deformation strength, the second length $L_2$ is more preferably 36% or less of the inter-attachment part length L.

<Simulation (4)>

A simulation was carried out on a plurality of analysis models different in welding position of the flange part with respect to the arm member. The shapes of the arm member and the reinforcement are the same as the shapes illustrated in FIG. 3 to FIG. 6, and the flange part is in contact with each of the top wall part, the first side wall part, and the second side wall part of the arm member. The welding position of the flange part to the arm member in each model is as follows.

Figure 4:
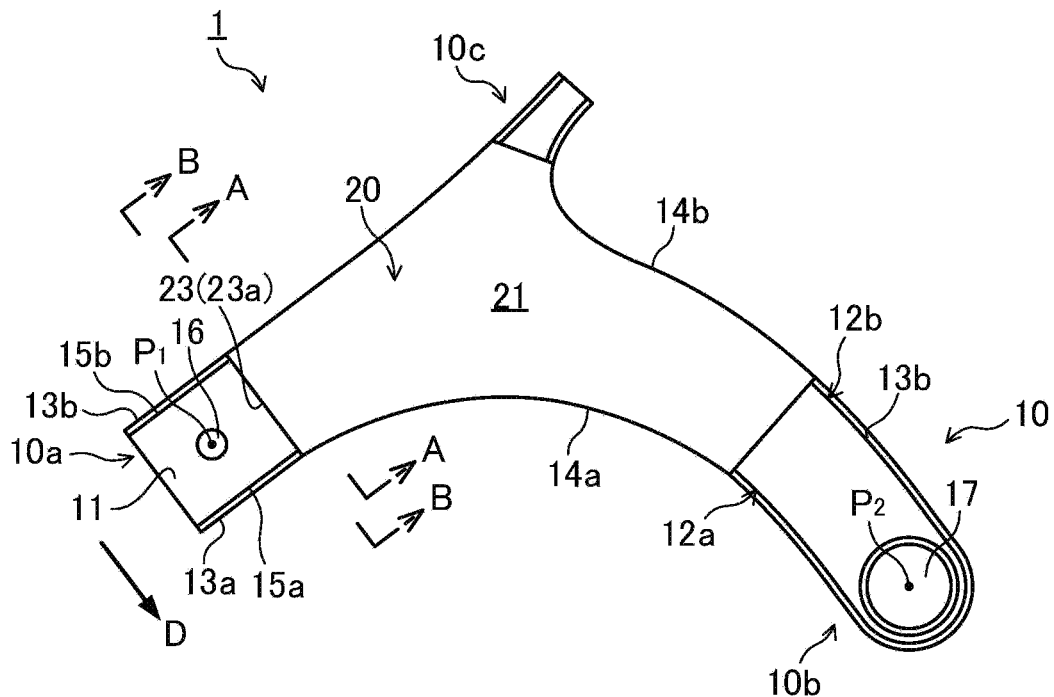
FIG. 4 is a plan view of the automobile suspension part.
Figure 19:
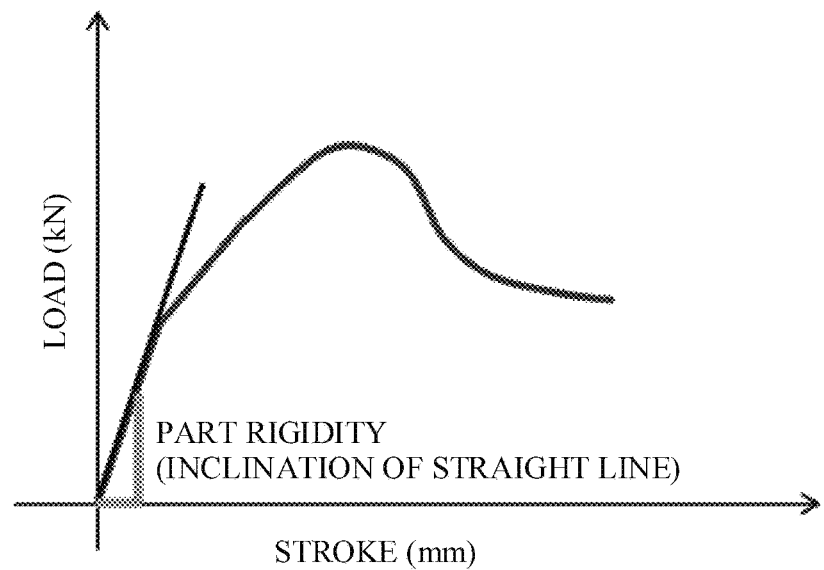
FIG. 19 is a load-stroke diagram
Figure 20:
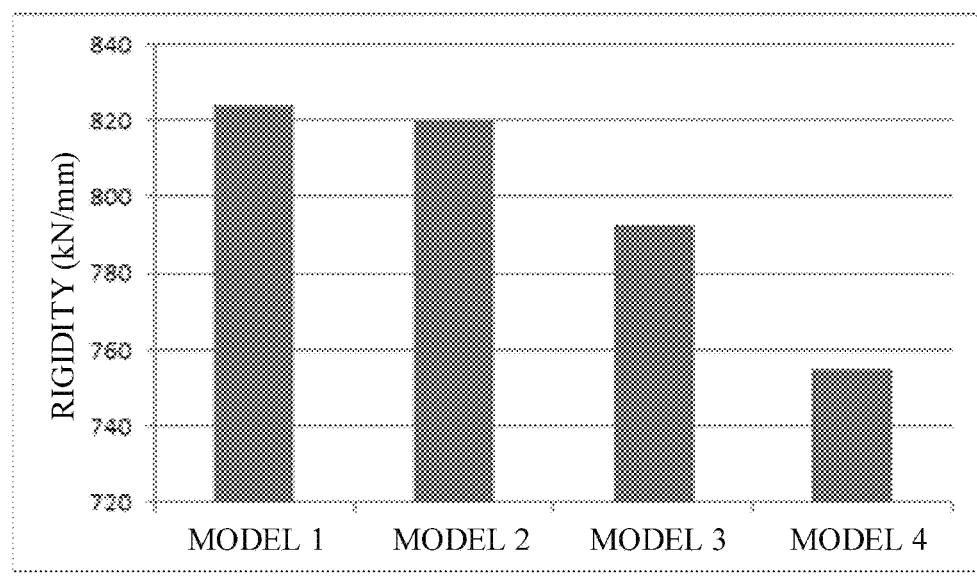
FIG. 20 is a chart illustrating a result of Simulation (4).

Model 1: the top wall part, the first side wall part, and the second side wall part
Model 2: only the top wall part
Model 3: the first side wall part and the second side wall part
Model 4: not joined In this simulation, the rigidity is evaluated by moving the first end part 10a along the direction D in FIG. 4 as in Simulation (1). The rigidity is evaluated by the inclination of the straight line in a region where the stroke and the load in a load-stroke diagram (for example, FIG. 19) are in a proportional relation. It can be said that a larger inclination of the straight line indicates a higher rigidity. The result of Simulation (4) is illustrated in FIG. 20. As illustrated in FIG. 20, Model 1 and Model 2 in each of which the flange part of the reinforcement is joined to the top wall part of the arm member have higher rigidity than those of other models. This reveals that if the top plate part and the flange part are joined, the joining to the side wall parts does not so much contribute to the rigidity.

<Simulation (5)>

Figure 21:
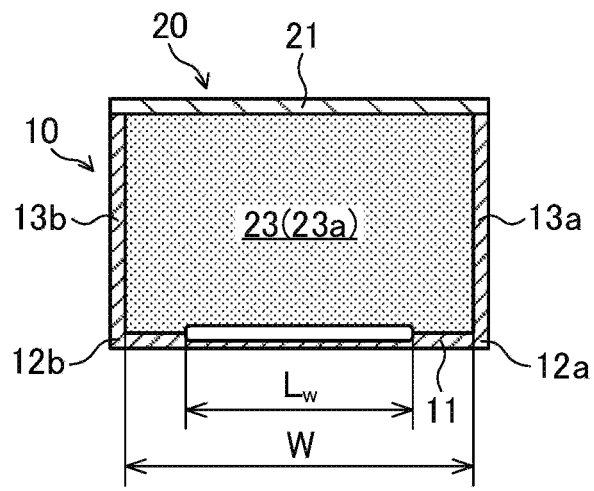
FIG. 21 is a view for explaining an analysis model of Simulation (5).
Figure 22:
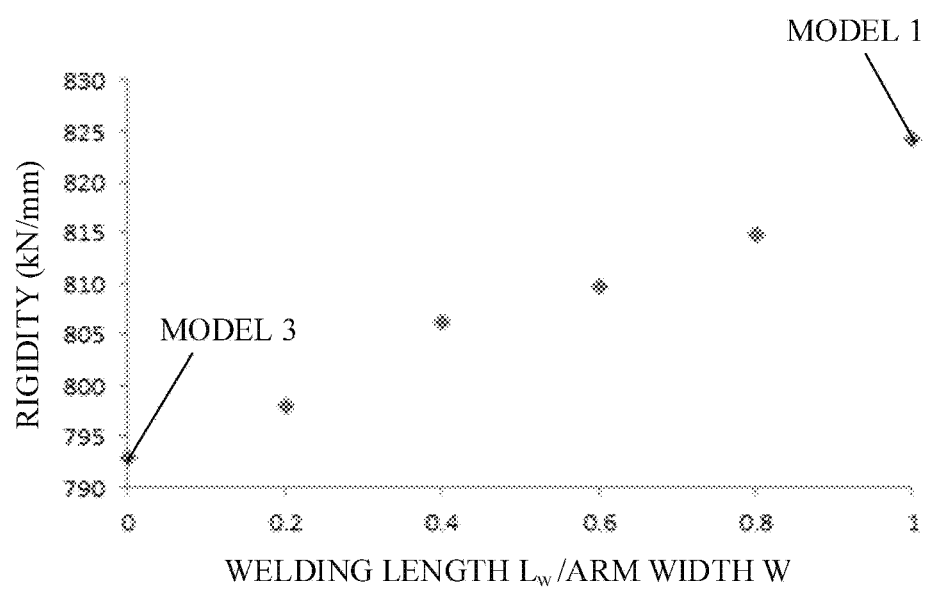
FIG. 22 is a chart illustrating a result of Simulation (5).

A simulation was carried out on a plurality of analysis models changed in welding length $L_W$ (FIG. 21) between the flange part 23 and the top wall part 11 with respect to Model 1 in Simulation (4). The result of Simulation (5) is illustrated in FIG. 22. Note that an arm width W in FIG. 22 is an interval between the first side wall part 13a and the second side wall part 13b of the arm member 10. As illustrated in FIG. 22, even the model in which the whole region of the flange part 23 is not joined to the top wall part 11 has high rigidity.

<Simulation (6)>

Figure 23:
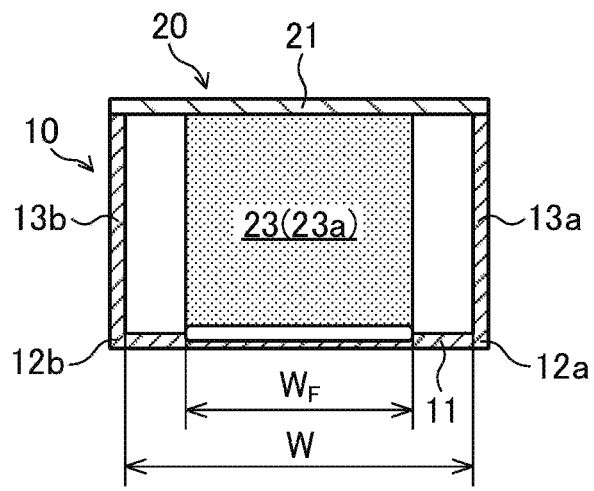
FIG. 23 is a view for explaining an analysis model of Simulation (6).
Figure 24:
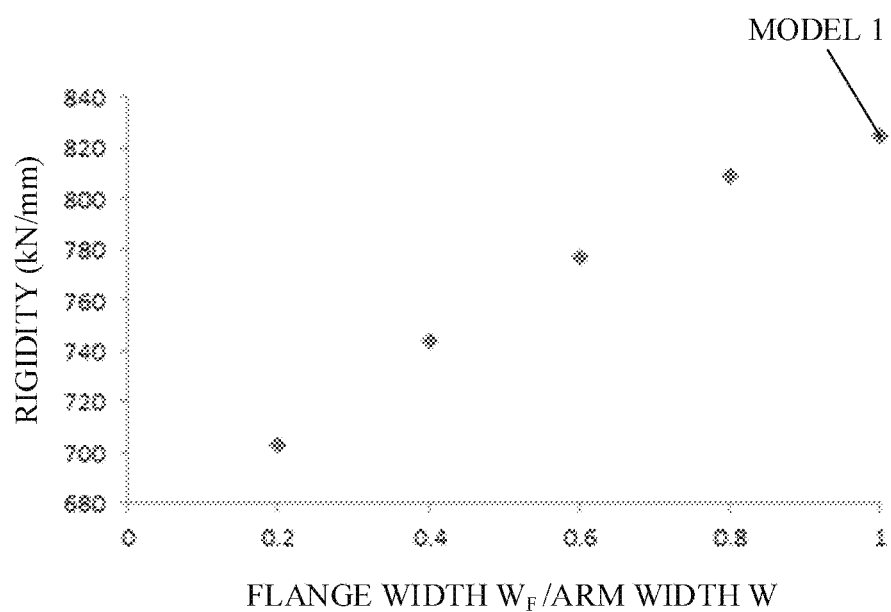
FIG. 24 is a chart illustrating a result of Simulation (6).

A simulation was carried out on a plurality of analysis models changed in width $W_F$ (FIG. 23) of the flange part 23 with respect to Model 2 in Simulation (4) In this simulation, the width $W_F$ of the flange part 23 and the above welding length $L_W$ are equal to each other. The result of Simulation (6) is illustrated in FIG. 24. As illustrated in FIG. 24, the model in which the flange part 23 is connected to the first side wall part 13a and the second side wall part 13b has high rigidity, whereas the case where the width $W_F$ is short, the rigidity greatly decreases. Therefore, the flange part 23 is preferably connected to the first side wall part 13a and the second side wall part 13b.

<Simulation (7)>

Figure 25:
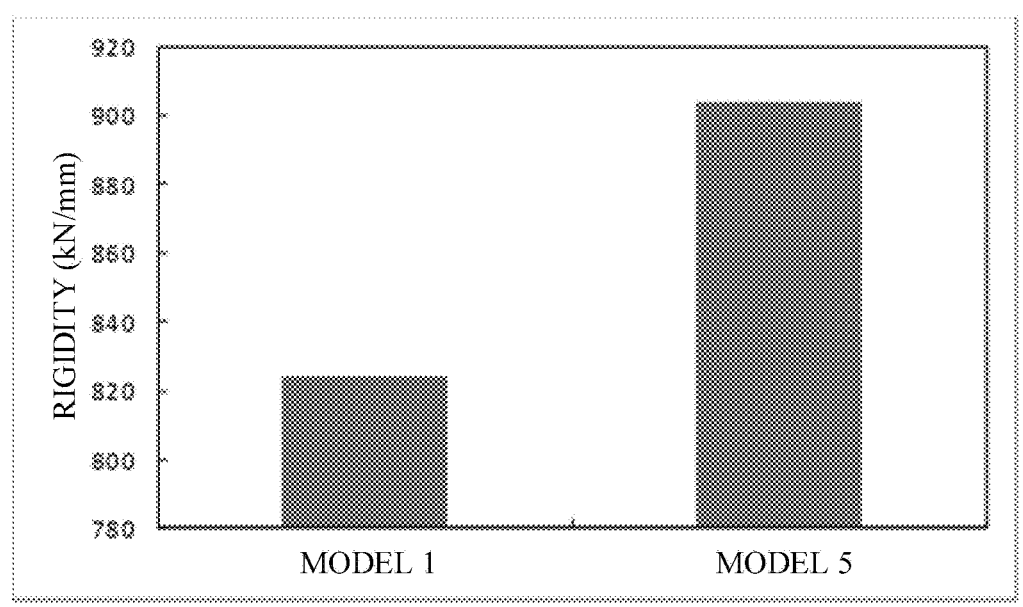
FIG. 25 is a chart illustrating a result of Simulation (7).

A simulation was carried out on an analysis model (hereinafter, "Model 5") in which the third ridge line part 22 of the reinforcement 20 stands with respect to the first side wall part 13a and the second side wall part 13b as in FIG. 8 and FIG. 9. The flange part in Model 5 is joined to each of the top wall part 11, the first side wall part 13a, and the second side wall part 13b of the arm member. The result of Simulation (7) is illustrated in FIG. 25. Note that the model being a target of comparison for Model 5 is Model 1 in Simulation (4). Model 1 is the model in FIG. 10 in which the third ridge line part 22 does not stand with respect to the first side wall part 13a and the second side wall part 13b. The difference between Model 1 and Model 5 is only whether or not the third ridge line part 22 stands with respect to the first side wall part 13a and the second side wall part 13b. As illustrated by the result in FIG. 25, Model 5 is further increased in rigidity as compared with Model 1 in which the rigidity is highest in above Simulations (4) to (6). Accordingly, from the viewpoint of improvement of rigidity, the third ridge line part of the reinforcement preferably stands with respect to the first side wall part and the second side wall part of the arm member.

INDUSTRIAL APPLICABILITY

The technique relating to this disclosure is usable, for example, as a front lower arm of an automobile.

EXPLANATION OF CODES 1 automobile suspension part
10 arm member
10a first end part
10b second end part
10c third end part
11 top wall part
12a first ridge line part
12b second ridge line part
13a first side wall part
13b second side wall part
14a first curved part
14b second curved part
15a first straight part
15b second straight part
16 hole
17 hole
20 reinforcement
21 bottom wall part
22 third ridge line part
23 flange part
23a first flange part
23b second flange part
$C_F$ first curved line
C second curved line
C' line made by offsetting visible outline of first ridge line part
L length from $P_2$ to $P_1$
$L_1$ length from $P_2$ to first flange part
$L_2$ length from $P_2$ to second flange part
$L_W$ welding length between flange part and top wall part
O curvature center of first curved line
$P_1$ first attachment part
$P_2$ second attachment part
R radial direction
W arm width
$W_F$ width of flange part

The invention claimed is:

1. An automobile suspension part comprising
an arm member in a groove shape and a reinforcement in a plate shape, wherein:
the arm member comprises a top wall part, a first ridge line part, a second ridge line part, a first side wall part, and a second side wall part;
the top wall part comprises a first attachment part at a first end part;
the top wall part comprises a second attachment part at a second end part;
the first ridge line part is sandwiched between the top wall part and the first side wall part;
the second ridge line part is sandwiched between the top wall part and the second side wall part;
the first ridge line part and the second ridge line part extend along an extending direction of the top wall part;
the reinforcement comprises a bottom wall part, a third ridge line part, and a flange part;

the third ridge line part is sandwiched between the bottom wall part and the flange part;

the bottom wall part is joined to the first side wall part and the second side wall part;

a transverse cross-section of the automobile suspension part comprising the arm member and the reinforcement is a closed cross-section;

the third ridge line part is connected to the first side wall part and the second side wall part;

the flange part is joined to the top wall part between the first attachment part and the second attachment part; and the flange part is connected to the first side wall part and the second side wall part.

2. The automobile suspension part according to claim 1, wherein the third ridge line part contacts and stands with respect to the first side wall part and the second side wall part.

3. The automobile suspension part according to claim 2, wherein the flange part is welded to the first side wall part and the second side wall part.

4. The automobile suspension part according to claim 1, wherein the flange part is welded to the first side wall part and the second side wall part.

5. The automobile suspension part according to claim 1, wherein:

the first ridge line part comprises a first curved part curved to an inner side of the top wall part;

the first ridge line part comprises a first straight part on a side closer to the first end part than is the first curved part;

the second ridge line part comprises a second curved part curved to an outer side of the top wall part;

the second ridge line part comprises a second straight part on a side closer to the first end part than is the second curved part; and the transverse cross-section of the automobile suspension part comprising the flange part comprises the first straight part and the second straight part.

6. The automobile suspension part according to claim 5, wherein a first length $L_1$ is 83% or more of an inter-attachment part length L, where:

the first length $L_1$: a length from the second attachment part to the flange part on a line C';

the inter-attachment part length L: a length from the second attachment part to the first attachment part on the line C'; and the line C': a line made by offsetting a visible outline of the first ridge line part so as to pass through the first attachment part and the second attachment part in a plan view viewed from a direction perpendicular to the top wall part.

7. The automobile suspension part according to claim 6, wherein:

the reinforcement comprises a first flange part and a second flange part as the flange part;

the first length $L_1$ is a length from the second attachment part to the first flange part on the line C'; and a second length $L_2$ is 36% or less of the inter-attachment part length L, where the second length $L_2$: a length from the second attachment part to the second flange part on the line C'.

\* \* \* \* \*